(12) United States Patent  
Dauvergne et al.

(10) Patent No.: US 6,631,940 B2  
(45) Date of Patent: Oct. 14, 2003

(54) DOOR FOR A VEHICLE, IN PARTICULAR A MOTOR VEHICLE

(75) Inventors: Jean Dauvergne, Harnes (FR); Delphine Montavon, Harnes (FR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/974,764

(22) Filed: Oct. 9, 2001

(65) Prior Publication Data

US 2002/0158486 A1 Oct. 31, 2002

(51) Int. Cl.[7] .............................. B60J 5/04; B60J 10/08
(52) U.S. Cl. .................................. 296/146.6; 296/146.9
(58) Field of Search ........................... 296/146.1, 146.2, 296/146.5, 146.6, 146.7, 146.9, 188

(56) References Cited

U.S. PATENT DOCUMENTS

| | | | | |
|---|---|---|---|---|
| 1,826,440 A | * | 10/1931 | Tarbox ........................ 296/202 |
| 3,868,796 A | * | 3/1975 | Bush ........................ 52/783.12 |
| 3,964,208 A | * | 6/1976 | Renner et al. ................ 49/502 |
| 3,989,275 A | * | 11/1976 | Finch et al. ................ 280/751 |
| 4,017,117 A | * | 4/1977 | Eggert, Jr. ............... 296/146.9 |
| 4,306,381 A | * | 12/1981 | Presto .......................... 49/502 |
| 4,773,697 A | * | 9/1988 | Svensson .................... 296/152 |
| 4,969,680 A | * | 11/1990 | Shimoda .................. 296/146.6 |
| 4,993,775 A | * | 2/1991 | Keys ............................ 296/201 |
| 5,048,234 A | * | 9/1991 | Lau et al. ..................... 49/502 |
| 5,102,163 A | * | 4/1992 | Ishikawa .................... 280/751 |
| 5,255,953 A | * | 10/1993 | Frank ....................... 296/146.6 |
| 5,345,720 A | * | 9/1994 | Illbruck et al. ............... 49/502 |
| 5,482,344 A | * | 1/1996 | Walker et al. ............. 296/39.1 |
| 6,231,112 B1 | * | 5/2001 | Fukumoto et al. ........ 296/146.5 |
| 6,364,398 B1 | * | 4/2002 | Kim ........................ 296/146.6 |
| 2001/0017476 A1 | * | 8/2001 | Nishikawa et al. ...... 296/146.6 |

FOREIGN PATENT DOCUMENTS

| | | | | |
|---|---|---|---|---|
| DE | 4202475 | * | 7/1992 | .............. 296/146.7 |
| EP | 236291 | * | 9/1987 | ................. 49/501 |
| EP | 302725 | * | 2/1989 | ................. 49/352 |
| JP | 63061627 | * | 3/1988 | ................. 49/501 |
| JP | 04300715 | * | 10/1992 | .............. 296/146.6 |
| JP | 06001145 | * | 1/1994 | .............. 296/146.6 |

* cited by examiner

Primary Examiner—Stephen T. Gordon  
Assistant Examiner—Paul Chenevert  
(74) Attorney, Agent, or Firm—Harrison & Egbert

(57) ABSTRACT

A door for a vehicle, in particular a motor vehicle, having a face designed to be orientated towards the interior of the vehicle or interior face, and a face designed to be orientated towards the exterior of the vehicle, or exterior face. The door permitting the installation of one or more fittings at least partially located, in particular, between the interior and exterior faces. The door is constituted by a reinforcement, capable of supporting the fitting or fittings, and by means for cladding the reinforcement, defining with the reinforcement, on either side thereof, interior and exterior compartments enabling the fitting or fittings to be accommodated.

11 Claims, 4 Drawing Sheets

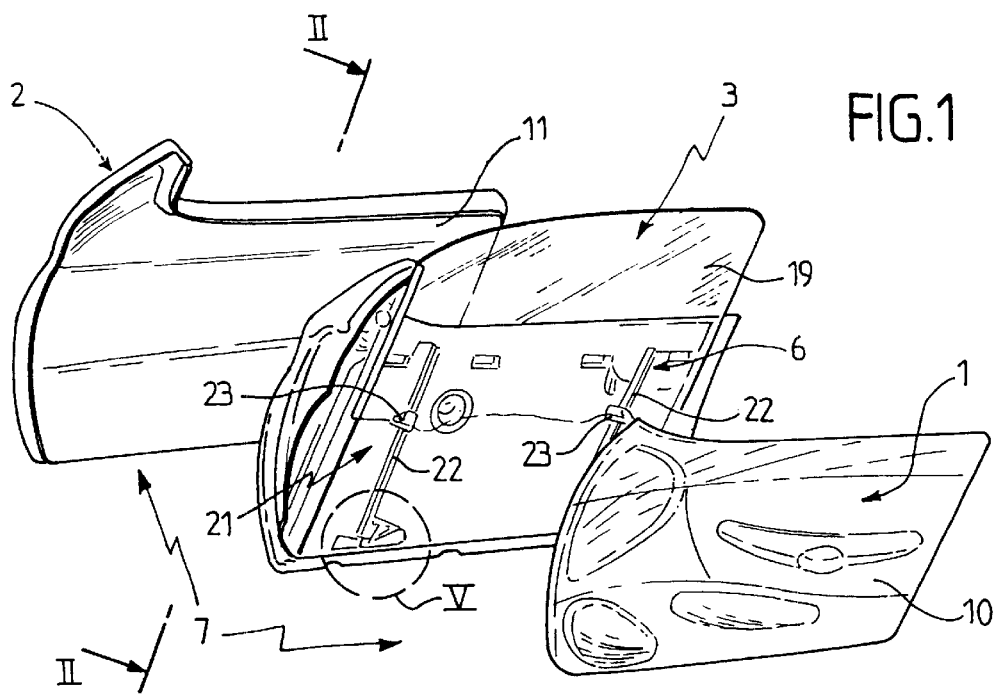
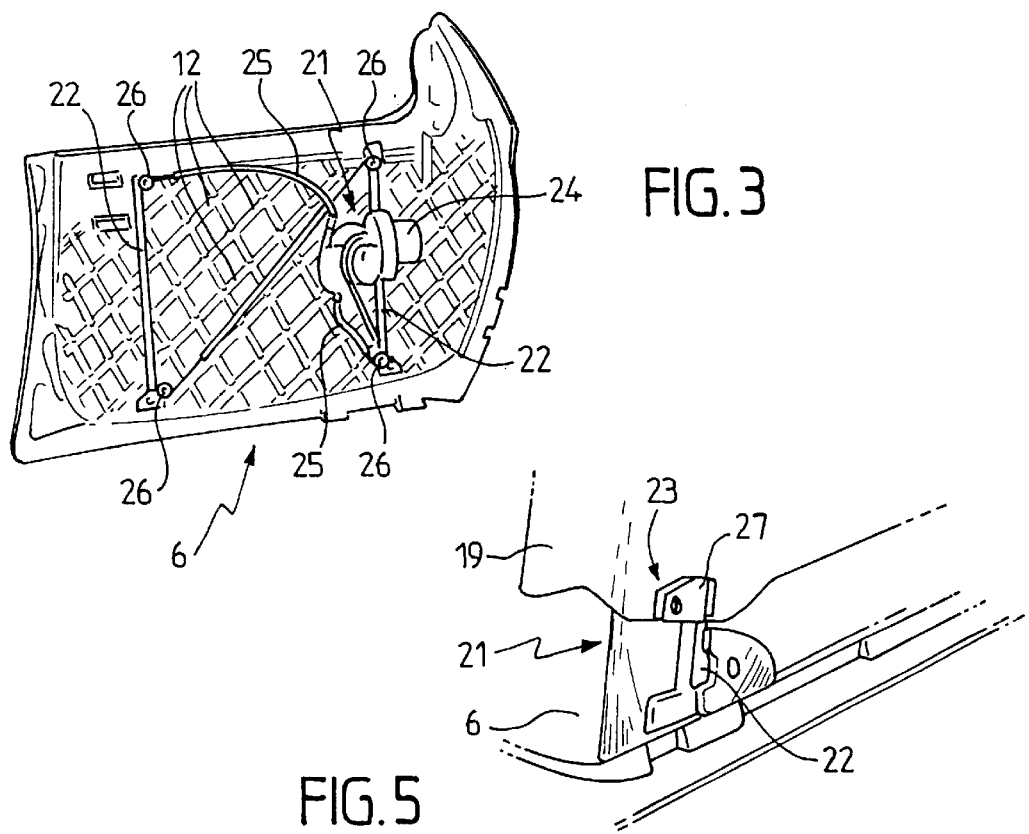

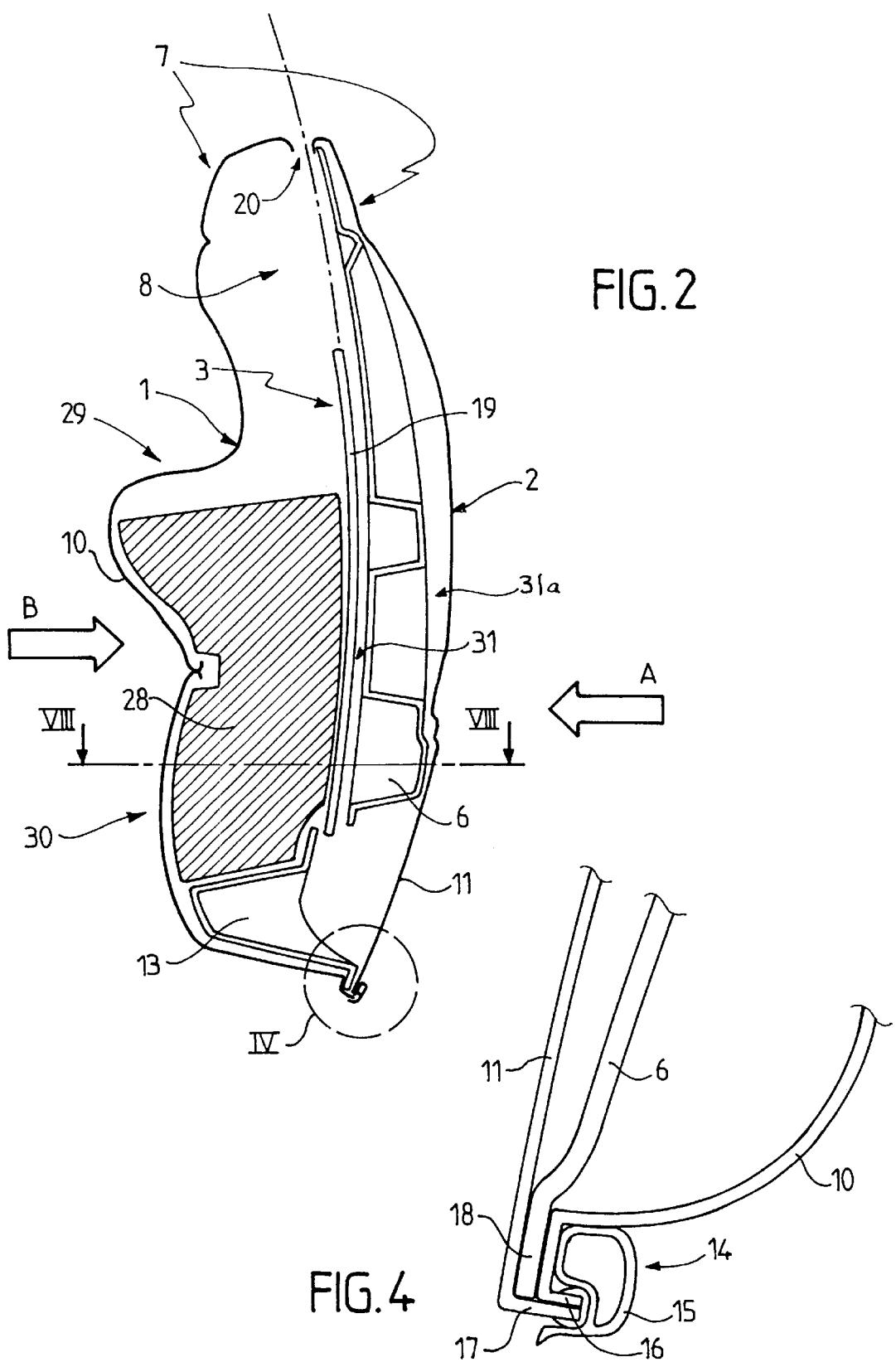

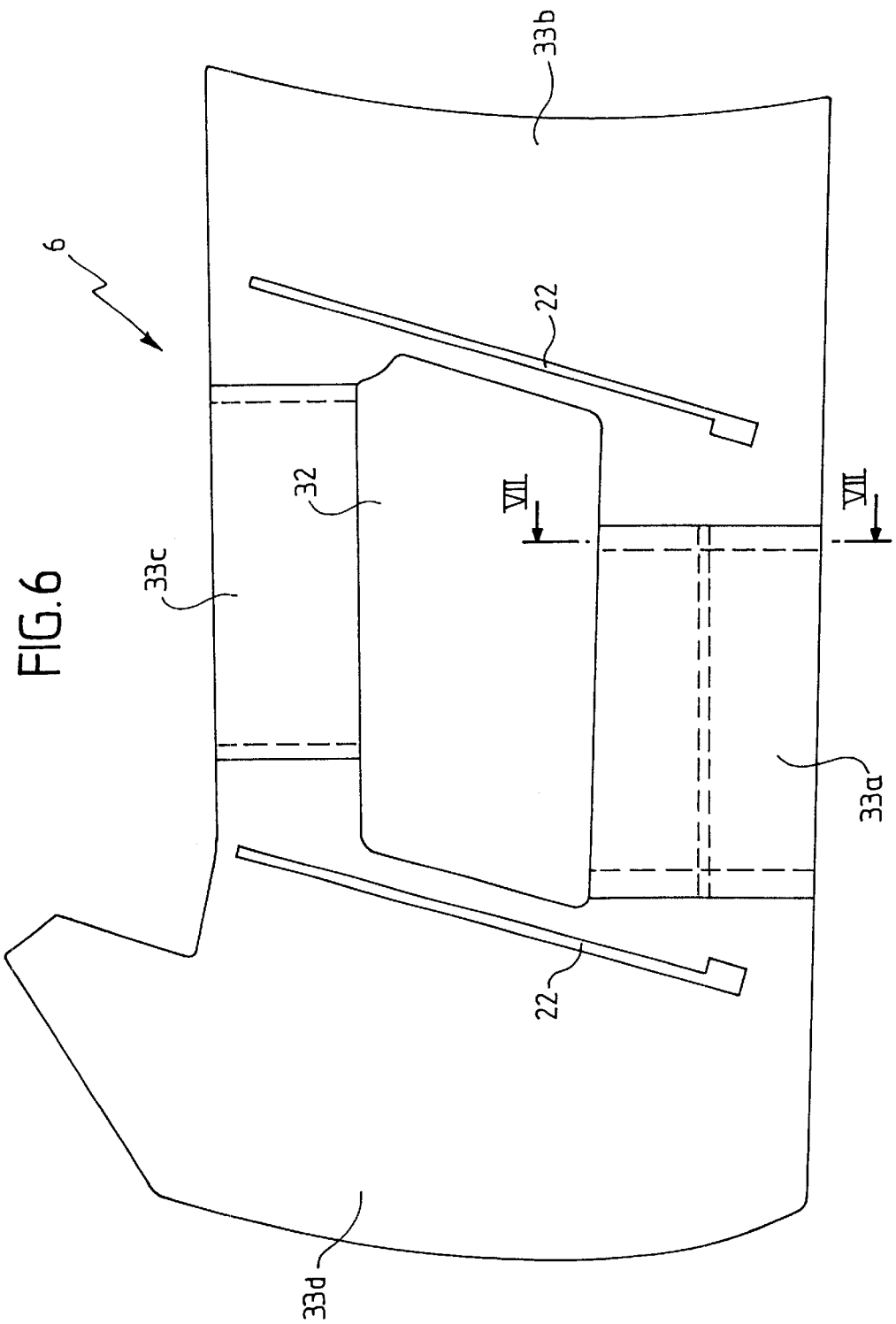

DOOR FOR A VEHICLE, IN PARTICULAR A MOTOR VEHICLE

BACKGROUND OF THE INVENTION

1. Field of the Invention

The invention relates to a door for a vehicle, in particular a motor vehicle.

2. Description of Related Art

At present, in the field of motor vehicles, the doors are constituted by a box structure obtained by drawing and assembling pieces of steel sheet. Such a box structure supports various items of vehicle fittings such as, for example, a window and its opening/closing device, a lock, a loudspeaker, or again, hinges or other items. It is clad, on the side orientated towards the interior of the vehicle, with a cladding panel. As to the opposite side, this defines the exterior face of the door.

Such a structure thus affords little freedom as to the choice of the characteristics of the exterior face.

It is also to be noted that the fact of using assembled, sheet metal members leads to difficulties in observing the requisite dimensions of the doors, and which can affect the precision with which they are positioned in relation to the rest of the bodywork of the vehicle.

In addition, the doors described above are not entirely satisfactory with regard to protection from attempts at forcible entry and impact strength. Furthermore, they are very heavy.

BRIEF SUMMARY OF THE INVENTION

The object of the invention is to provide a door for a vehicle, in particular a motor vehicle, that overcomes the aforementioned drawbacks and offers greater freedom of choice as to its cladding, both interior and exterior, in order to be able to improve, in particular, its aesthetic appearance and/or its aerodynamic qualities, while, at the same time, preserving a relatively high degree of standardization of the members that constitute it.

Another object of the present invention is to provide a door, in particular for a motor vehicle, the dimensioning and/or positioning precision of which can be improved.

Another object of the present invention is to provide a door for a vehicle, in particular a motor vehicle, having enhanced protection from attempts at forcible entry and impact strength.

One advantage of the invention is that it makes it possible to increase the rationalization of the production of the vehicles so equipped.

Further objects and advantages of the invention will emerge in the course of the description that follows, which is provided only by way of illustration, and which is not intended to limit it.

The invention relates to a door for a vehicle, in particular a motor vehicle, having a face designed to be orientated towards the interior of the vehicle, or so-called interior face, and a face designed to be orientated towards the exterior of the vehicle, or so-called exterior face, said door permitting the installation of one or more fittings at least partially located, in particular, between said interior and exterior faces, characterized by the fact that said door is constituted by a frame or reinforcement, capable of supporting said fitting or fittings, and by means for cladding said reinforcement, defining with the latter, on either side thereof, interior and exterior compartments enabling said fitting or fittings to be accommodated.

BRIEF DESCRIPTION OF THE SEVERAL VIEWS OF THE DRAWINGS

The invention will be more readily understood from a study of the following description, accompanied by the annexed drawings.

FIG. 1 is an exploded perspective view of a exemplary embodiment of the door according to the invention.

FIG. 2 is a sectional view along a vertical, transverse cross-sectional plane, marked II—II in FIG. 1.

FIG. 3 is a perspective view of one of the items shown in FIG. 1, viewed the opposite way around from that of said latter figure.

FIG. 4 is a detailed view of a part marked IV of FIG. 2.

FIG. 5 is a detailed view of a part marked V of FIG. 1.

FIG. 6 is a front view of an alternative embodiment of one of the members of the door according to the invention.

DETAILED DESCRIPTION OF THE INVENTION

Figure 7:
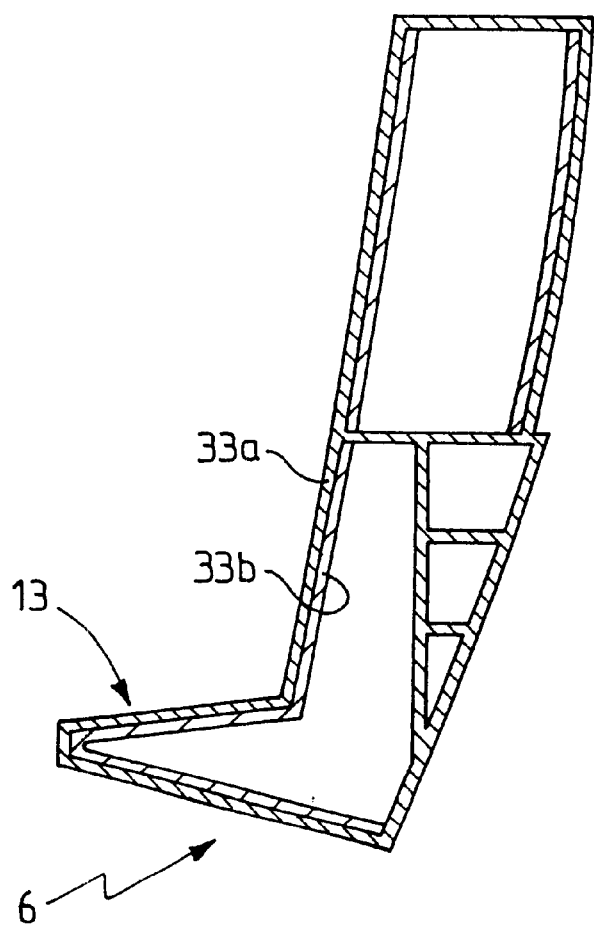
FIG. 7 is a cross-sectional view along line VII—VII shown in FIG. 6.

The invention relates to a door for a vehicle, in particular a vehicle. It can be a side door.

As illustrated in FIGS. 1 and 2, the door according to the invention has a face 1 designed to be orientated towards the interior of the vehicle, or so-called interior face, and a face 2 designed to be orientated towards the exterior of the vehicle, or so-called exterior face.

Said door permits the installation of one or more fittings 3 at least partially located, in particular, between said interior face 1 and said exterior face 2.

Said fittings may be mobile. As discussed in greater detail below, these can be a window 19 and its opening/closing system 21. They can also be, for instance, locks, loudspeakers, or hinges and/or pulling members.

According to the invention, said door is constituted by a frame or reinforcement 6, capable of supporting said fitting or fittings 3, and by means 7 for cladding said reinforcement 6, defining with the latter, on either side thereof, interior, 8, and exterior, 9, compartments enabling said fitting or fittings 3 to be accommodated.

Thanks to the presence of central reinforcement 6, which serves to support fittings 3, this function no longer needs to be filled by cladding means 7, which opens up a number of possibilities as to their characteristics and makes it possible to enhance their aesthetic appearance and/or their aerodynamic features, while, at the same time, preserving characteristics that can be constant for said reinforcement.

Thus, in the event of a change in the type and/or level of range of vehicle, it is possible to keep the same reinforcement from one type of vehicle to another, differentiation being obtained via the cladding means.

The shape, material and/or method of manufacturing of the latter, for example, will differ from those of the reinforcement.

Said cladding means 7 are constituted, in particular, by a first panel 10, or so-called interior panel, having said interior face 1, and by a second panel 11, or so-called exterior panel, having said exterior face 2.

Said exterior panel 11 can be constituted, for example, by a moulded thermoplastic material. As to the interior panel 10, it can be constituted by a core clad with a skin, according to different examples, known to a person skilled in the art.

Said reinforcement 6 is constituted, for instance, by plastic and/or metallic materials, for example of cast aluminum.

It can be hardened, if necessary, in order to enhance the resistance of the door to lateral impact.

As illustrated in FIG. 3, said reinforcement 6 can be provided for this purpose, for example, with cris-crossing ribs 12, located, in particular, on the side of reinforcement 6 facing exterior panel 11.

The materials chosen to constitute reinforcement 6 can also contribute to reinforcing the strength of the door.

According to its different characteristics, said reinforcement 6 thus has a global role of structuring the door, ensuring at the same time its rigidity and support for the fittings.

Referring once again to FIG. 2, it will be noted that said reinforcement 6 can further have, in its lower portion, a spacer 13 in the form of a deformation in the direction of said interior face 1, designed to provide a bearing point for said door on the chassis and/or the seat of the vehicle, for the purpose of establishing a rigid connection with the chassis and/or the seat in the event of a lateral impact.

This being said, said interior panel 10 and exterior panel 11 and said reinforcement 6 have, notably, the same contour, and are fixed to one another over at least a portion of their periphery, such a solution makes it possible to simplify the structure of the means used to join them, which can be constituted by a single member, at least laterally.

As illustrated in FIG. 4, in this connection, said interior panel 10, exterior panel 11 and/or said reinforcement 6 have, along one portion at least of their periphery, a housing 14, said door further comprising one joint and/or joints 15 capable of co-operating with said housing or housings 14 to enable interior panel 10, exterior panel 11 and said reinforcement 6 to be held by pinching together, in the area of said housing or housings 14.

Said housing or housings 14 can be located on said interior panel 10 and/or said reinforcement 6, and have an opening designed to be directed towards the interior of the vehicle. Said joint 15 can thus be, concealed by said interior panel 10.

According to the particular exemplary embodiment illustrated, said interior panel 10 and exterior panel 11 are provided with a skirt 16, 17, pinched together by said joint 15, the corresponding edge 18 of said reinforcement 6 being sandwiched between said interior panel 10 and exterior panel 11, just short of their skirts 16, 17. This solution corresponds to the lower edge of the door. It could, of course, be used in the area of the lateral and/or upper edges. Many other solutions, possibly, complementary, could also be used, such as, in particular, built-on members snap fitting into one another and/or inserts.

With further reference to FIGS. 1 and 2, it will be noted that the door according to the invention can be equipped with a window 19 capable of being retracted from a first position, or so-called closed position, illustrated in FIG. 1, to a second position, or so-called open position, illustrated in FIG. 2.

According to the invention, reinforcement 6 is completely on the exterior side in relation to window 19, with the exception of spacer 13. Security is enhanced in this way, both in the event of impact and/or attempts at forcible entry.

Said window 19 is provided between said reinforcement 6 and said interior panel 10, the latter defining between them, in the area of their upper edges, provided facing one another, a slot 20 to permit the passage of said window 19.

As illustrated in FIGS. 3 and 5, the door according to the invention can further comprise means 21 for operating said window 19, supported by said reinforcement 6.

These can take the form, on one hand, of one or more ports provided in reinforcement 6 to form one or more rails 22, for instance two parallel orientated rails and, on the other hand, of skids or runners 23, designed to slide along said rail or rails 22 through the effect of actuating means.

Said actuating means are located, for example, between said reinforcement 6 and said exterior panel 11. They are constituted, for instance, by a motor 24 fixed to said reinforcement 6 and driving a cable 25 connected to said runners 23 via various intermediate pulleys 26.

Said runners 23 are provided with means 27 for fixing said window 19. In order to facilitate movements, the latter can be guided along grooves formed in the body of said reinforcement 6 and/or mounted on the latter and/or fixed between said reinforcement 6 and said interior panel 10.

Figure 8:
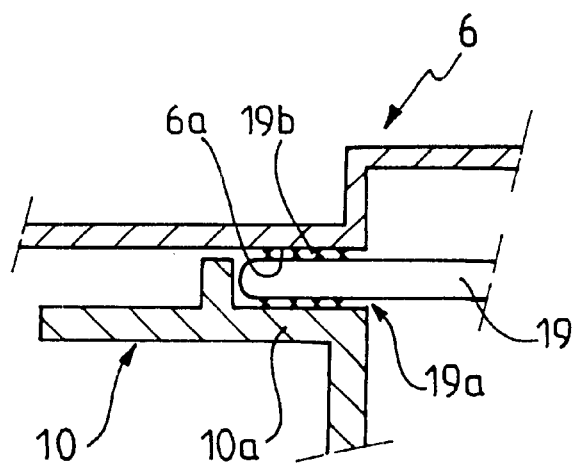
FIG. 8 is a cross-sectional view along line VIII—VIII illustrated in FIG. 2.

As shown in FIG. 8, for this purpose, reinforcement 6 comprises an area 6a which co-operates with a shape 10a of interior panel 10 to define grooves 19a. These grooves will possibly be covered with a material 19b such as baize to improve the sliding of said window 19 inside them.

According to the form of embodiment illustrated in the different figures, the door has an upper edge from which said window 19 extends, in closed position.

According to another form of embodiment, said reinforcement 6 and said interior panel 10 and exterior panel 11 are prolonged facing one another to form a frame for said window 19.

As illustrated in FIG. 2, the door according to the invention further possibly comprises a block of material 28, capable of partially filling interior compartment 8 so as to enhance locally the strength of interior panel 10.

More precisely, said interior panel 10 can have deformed areas, recessed and/or in relief, defining, for instance, an armrest 29 or a side panel 30. Said block of material 28 is then provided opposite said interior panel 10. The material of said block 28 absorbs deformation energy.

Said block of material 28 and said reinforcement 6 have, in particular, a space 31 that is just sufficient to retract window 19. In the same way, reinforcement 6 is at a short distance from exterior panel 11, these two members defining between them a space 31a of limited width.

This arrangement of reinforcement 6 and of block of material 28 enables energy to be absorbed in the event of lateral impact caused by a vehicle or a so-called 'impacting' object striking the door in the direction A shown in FIG. 2. The impacting object comes into contact with reinforcement 6, after a distance over which the exterior panel 11 is deformed, reduced to a minimum; simultaneously, the passenger (not shown) comes into contact through the force of inertia with interior panel 10, in direction B and, more especially, with block of material 28, which can come to bear on reinforcement 6. The corresponding energy is then absorbed by material 28, after compensation for spaces 31 and 31a.

Aforementioned spacer 13 is designed to be capable of coming into contact with the structure of the chassis of the vehicle (not shown), so as to come to bear thereon when the impacting object strikes in direction A.

As illustrated in FIGS. 1 to 5, said reinforcement 6 is solid and in one piece.

According to another form of embodiment, illustrated in FIGS. 6 and 7, it can also have a central recess 32 and/or be constituted differently. More precisely, said reinforcement 6 can be constituted by different planiform members 33a, 33b, 33c, 33d having a given profile, assembled and/or fitted in relation to one another to impart to reinforcement 6 a box-like structure.

The term "planiform" is to be taken as meaning members that are not necessarily plane; they may possibly be tubular, or even sub-divided into sub-box units, but constituted by one or more faces the thicknesses of which are much smaller than the other dimensions. They can, for example, be extruded sections.

They are assembled to one another, in particular, by crimping, gluing, welding, screwing or other techniques.

Such a box-like structure has the advantage of increasing the rigidity of the door according to the invention.

Other forms of embodiment, within the grasp of a person skilled in the art, could, of course, have been contemplated without thereby departing from the scope of the invention.

We claim:

1. A door for a motor vehicle comprising:
   an interior panel having an interior face thereon;
   an exterior panel having an exterior face thereon;
   at least one fitting at least partially located between said interior face and said exterior face;
   a reinforcement supporting the fitting thereon, said reinforcement defining an interior compartment on a side facing said interior panel and an exterior compartment on a side facing said exterior panel, said interior compartment and said exterior compartment receiving the fitting therein, said interior panel and said exterior panel and said reinforcement having a same contour and fixed together over at least a portion of a periphery thereof;
   a housing affixed along at least a portion of the periphery of said interior panel and said reinforcement so as to open toward an interior of the vehicle; and
   at least one joint cooperative with said housing so as to pinch said interior panel and said exterior panel and said reinforcement together in an area of said housing.

2. The door of claim 1, said reinforcement being a rigid member.

3. The door of claim 1, said reinforcement having a spacer in a lower portion thereof, said spacer bearing against said interior panel.

4. The door of claim 1, said reinforcement comprising of a plurality of planiform members joined together so as to define a box-type structure.

5. The door of claim 1, further comprising:
   a block of material partially filling said interior compartment so as to enhance a strength of said interior panel.

6. The door of claim 5, said block of material and reinforcement defining a space therebetween.

7. The door of claim 1, further comprising:
   a window positioned between said interior panel and said exterior panel, said reinforcement positioned on a side of said window facing said exterior panel.

8. The door of claim 7, said reinforcement and said interior panel and said exterior panel forming a frame of said window.

9. The door of claim 7, said window being movable between a closed position and an open position, said reinforcement and said interior panel defining a slot along respective upper edges thereof, said window movable through said slot between said open position and said closed position.

10. The door of claim 9, said reinforcement defining an area cooperative with a shape of said interior panel so as to define guide grooves for the movement of said window therebetween.

11. The door of claim 10, said guide grooves being covered with a material in surface-to-surface contact with said window.

* * * * *